United States Patent
Grenzi

(10) Patent No.: US 8,851,583 B2
(45) Date of Patent: Oct. 7, 2014

(54) TRACK WITH ROTATING BUSHINGS FOR TRACK-TYPE VEHICLES WITH IMPROVED SLIDING BEARINGS

(75) Inventor: Francesco Grenzi, Ferrara (IT)

(73) Assignee: Berco S.p.A., Copparo (Ferrara) (IT)

( * ) Notice: Subject to any disclaimer, the term of this patent is extended or adjusted under 35 U.S.C. 154(b) by 448 days.

(21) Appl. No.: 13/138,676

(22) PCT Filed: Jan. 27, 2010

(86) PCT No.: PCT/IB2010/000148
§ 371 (c)(1),
(2), (4) Date: Nov. 22, 2011

(87) PCT Pub. No.: WO2010/109278
PCT Pub. Date: Sep. 30, 2010

(65) Prior Publication Data
US 2012/0056472 A1    Mar. 8, 2012

(30) Foreign Application Priority Data
Mar. 24, 2009   (IT) .............................. MI2009A0464

(51) Int. Cl.
*B62D 55/21*    (2006.01)

(52) U.S. Cl.
CPC ..................................... *B62D 55/21* (2013.01)
USPC ............................ 305/201; 305/103; 305/202

(58) Field of Classification Search
CPC ...... B62D 55/20; B62D 55/205; B62D 55/21; B62D 55/211; B62D 55/0087
USPC ......... 305/100, 101, 102, 103, 104, 105, 106, 305/185, 196, 198, 200, 201, 202, 203
See application file for complete search history.

(56) References Cited

U.S. PATENT DOCUMENTS 4,277,199 A * 7/1981 Livesay ........................ 403/317
5,183,318 A   2/1993 Taft et al.
(Continued)

FOREIGN PATENT DOCUMENTS

EP    1 258 419 A1   11/2002
JP    H01-114387 U  *  8/1989

OTHER PUBLICATIONS

PCT Search Report dated Apr. 21, 2010.

*Primary Examiner* — Kip T Kotter
(74) *Attorney, Agent, or Firm* — Hedman & Costigan, P.C.; James V. Costigan; Kathleen A. Costigan

(57) ABSTRACT

A track (10) for track-type vehicles is described, comprising a continuous sequence of articulated joints (12, 12') of the hinge type, oriented according to a first axis (A-A) substantially perpendicular to the central longitudinal development axis (B-B) of the track (10). The articulated joints (12, 12'), provided with pins (36, 36'), are connected to each other and maintained at a constant distance through pairs of links (14) having longitudinal development, arranged laterally and symmetrically with respect to the longitudinal central axis (B-B). Around each pin (36, 36') a bushing (40) is mounted free to rotate with respect to the pin (36, 36') itself and at least one sliding bearing (44) is press-fitted between each pin (36, 36') and the links (14). The presence of sliding bearings (44) made in composite material and having a small thickness and the geometrical/size characteristics of the links (14) and of the sliding bearings (44) themselves makes it possible to improve the stability and the fatigue and wearing resistance of the articulated joints (12, 12') of the track (10).

18 Claims, 4 Drawing Sheets

(56) References Cited

U.S. PATENT DOCUMENTS

| | | | |
|---|---|---|---|
| 5,201,171 A * | 4/1993 | Anderton et al. | 59/7 |
| 6,564,539 B2 * | 5/2003 | Bedford et al. | 59/7 |
| 7,347,513 B2 * | 3/2008 | Johannsen et al. | 305/203 |
| 7,661,774 B2 * | 2/2010 | Yamamoto et al. | 305/201 |
| 7,946,662 B2 * | 5/2011 | Maeda | 305/198 |
| 8,025,346 B2 * | 9/2011 | Livesay | 305/106 |
| 2003/0000747 A1 | 1/2003 | Sugiyama | |
| 2005/0040708 A1 * | 2/2005 | Yamamoto et al. | 305/202 |
| 2008/0141513 A1 | 6/2008 | Livesay | |

* cited by examiner

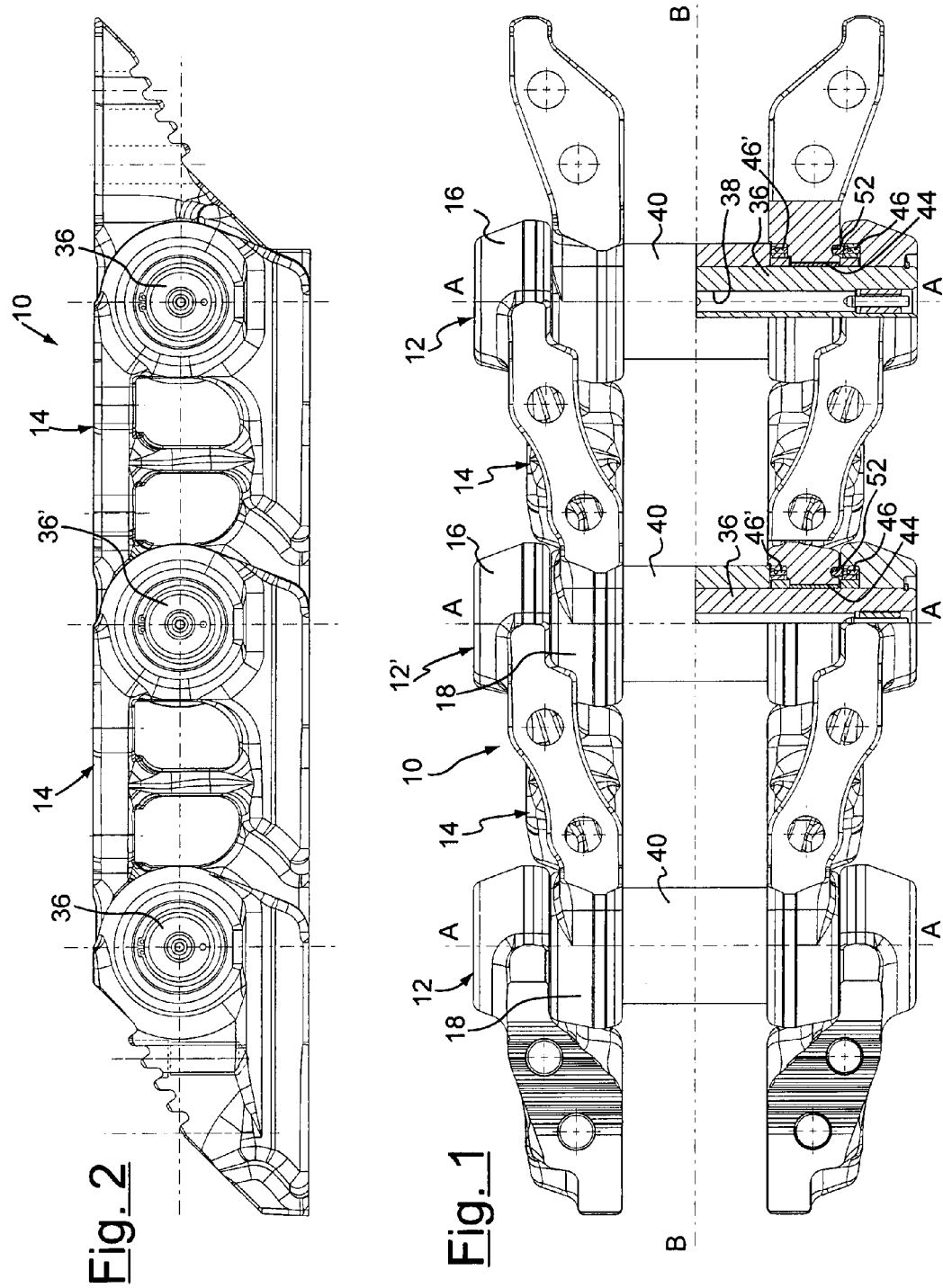

TRACK WITH ROTATING BUSHINGS FOR TRACK-TYPE VEHICLES WITH IMPROVED SLIDING BEARINGS

The present invention refers to a track with rotating bushings for track-type vehicles provided with improved sliding bearings, in particular but not exclusively to a track with rotating bushings for track-type vehicles intended for ground movement.

The tracks of a track-type work vehicle generally comprises a pair of parallel tracks, each obtained through a continuous sequence of hinge type articulated joints, connected to each other and maintained at a constant distance through suitable rigid connecting members, called "links" of the track.

The track also comprises a plurality of bushings and pins, interposed between the links so as to connect their ends to form the tracks. The bushings and the supported links cooperate with one another to form a plurality of track joints, which allow the necessary rotational movement between adjacent links. This allows the articulation of the adjacent links when the track rotates wound around the (driving and/or driven) wheels of the track-type vehicle. The rotation of the track allows the track-type vehicle to move on the ground to carry out the many functions for which it is intended.

When the track-type vehicle, typically a machine intended for ground movement, is operating on highly abrasive terrains, some of the components of the tracks must be periodically replaced since they undergo rapid wearing. In conventional type tracks, the replacement of a component of the track usually requires the track itself to be removed from the vehicle, carried out at a suitably equipped assistance centre. Consequently, the replacement procedure of the worn elements is very expensive and takes up a lot of time.

In particular, amongst the elements of a conventional track which undergo the most wearing there are without a doubt the bushings, each interposed between each connection pin between the links and the members necessary for transmitting motion to the tracks. The bushings are thus fixed with respect to the links of the track. The fixed bushings undergo substantial sliding friction, which cause both their internal and external cylindrical surfaces to deteriorate rapidly.

A partial decrease of the wearing of the bushings has been obtained with the release on the market of the so called lubricated tracks, in which, thanks to the circulation of lubricant, the internal wearing of the bushings when sliding with the respective pins has practically nullified. However, the wearing problem of the external cylindrical surface of the bushings remains the same even with lubricated tracks.

Tracks for track-type vehicles have thus been made in which the bushings are free to rotate with respect to the relative pin around which they are wound. In this way, during the movement of the tracks, the bushings mainly undergo rolling friction instead of sliding friction, with consequent greater resistance to wearing of the bushings themselves.

A track for track-type vehicles, according to the prior art, of the type provided with rotating bushings, is described, for example, in the U.S. Pat. No. 5,183,318 to Caterpillar Inc.

However, also the tracks provided with rotating bushings made to this day still have drawbacks.

A first drawback is due to the reduction of the structural rigidity of the entire tracks with respect to the tracks provided with fixed bushings. This reduction of the structural rigidity is due to the fact that the rotating bushings do not rigidly connect the links of the track.

Another drawback is due to the fact that the presence of the rotating bushings makes it necessary to have other rigid connecting elements between the links of the track and the relative pins. These connecting elements are typically made up of sliding bearings coaxially mounted around the pin and inside suitable through holes foreseen on each link. Such sliding bearings must withstand all the stresses which the track undergoes in the working steps of the track-type vehicle, without compromising the integrity of the joints.

It is also necessary to foresee sealing systems, which are able to prevent corrosive and abrasive mixtures of water, dirt, sand, stone or other mineral or chemical elements, to which the track is exposed to during its use, from entering into the joints.

It should thus be obvious that, if on one hand the rotating bushings undergo less wearing with respect to the fixed bushings fitted into the links, on the other hand the tracks with rotating bushings require there to be some specific elements which carry great loads and that thus have a shorter operative life than that of other elements of the track.

The general purpose of the present invention is therefore that of making a track with rotating bushings for track-type vehicles, provided in particular with improved sliding bearings, able to increase not only the life and wearing of the bushings, but also that of the other elements that form the joints of the track with respect to tracks according to the prior art.

Another purpose of the invention is that of providing a track with rotating bushings for track-type vehicles provided with improved sliding bearings, which makes it possible to obtain a balanced level of wearing for all the components belonging to the track itself, with the consequent possibility of better planning the maintenance operations on the track-type vehicle.

Yet another purpose of the invention is that of being able to have a track with rotating bushings for track-type vehicles provided with improved sliding bearings, that is easy to repair and that is interchangeable with other analogous tracks of the known type.

These purposes according to the present invention are achieved by making a track with rotating bushings for track-type vehicles provided with improved sliding bearings as outlined in claim 1.

Further characteristics of the invention are highlighted in the dependent claims, which are integral part of the present description.

The characteristics and the advantages of a track with rotating bushings for track-type vehicles, provided in particular with improved sliding bearings, according to the present invention shall become clearer from the following description, given as an example and not for limiting purposes, with reference to the attached schematic drawings in which:

FIG. 1 is a plan view of a portion of track with rotating bushings for track-type vehicles obtained according to the present invention;

FIG. 2 is a side view of the portion of track with rotating bushings of FIG. 1;

Figure 3:
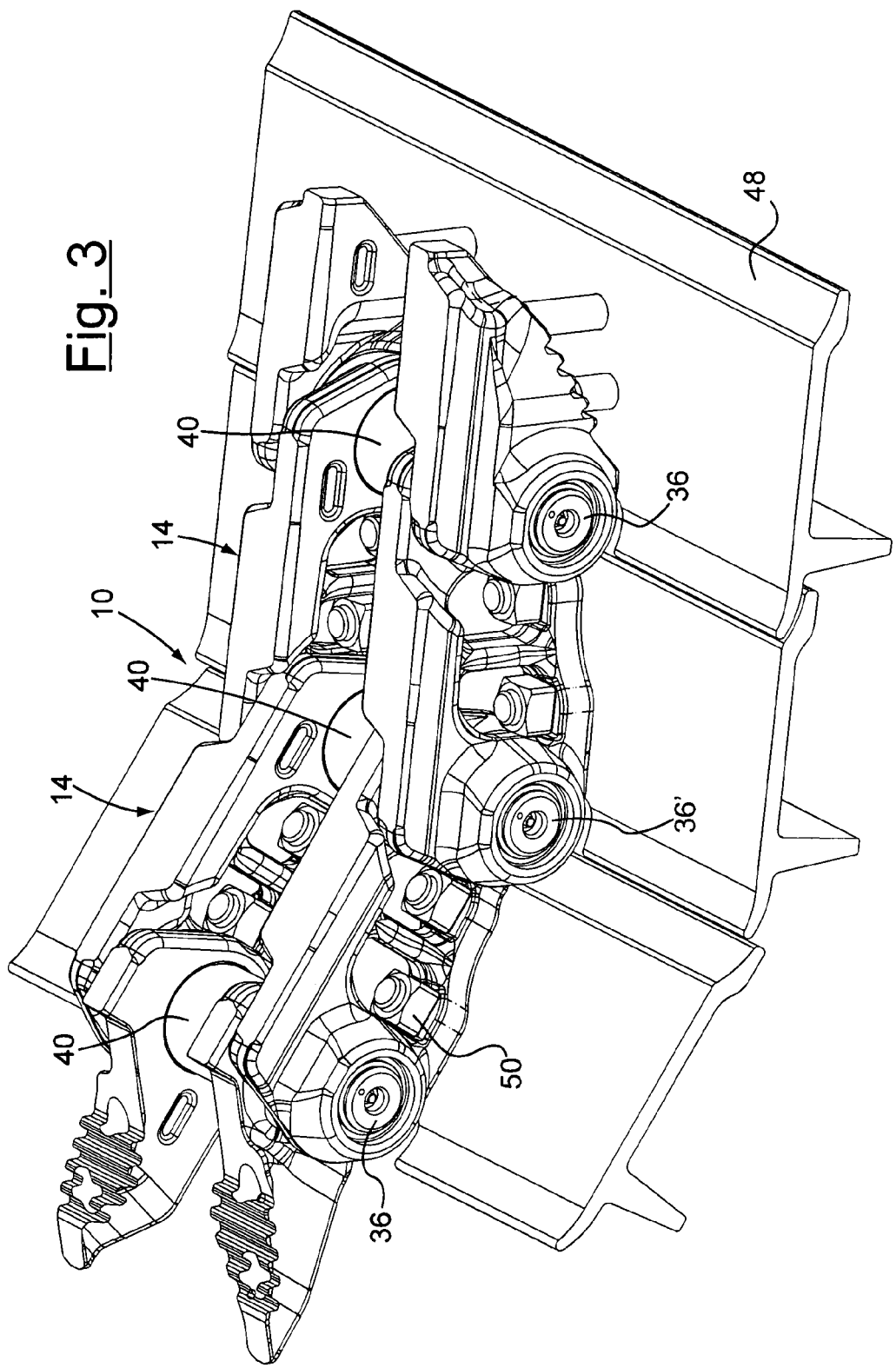
FIG. 3 is a perspective view of the portion of track with rotating bushings of FIG. 1, combined with the shoes of the tracks of the vehicle.

With reference to the figures, a portion of track is shown, which has rotating bushings according to the present invention, wholly indicated with the reference numeral 10.

The track 10 substantially consists of a continuous sequence of articulated joints 12, 12' of the hinge type, oriented according to an axis A-A substantially perpendicular to the central longitudinal development axis B-B of the track 10.

The articulated joints 12, 12' are connected to each other and maintained at a constant distance through pairs of links 14 having a longitudinal development, arranged laterally and symmetrically with respect to the longitudinal central axis B-B of the track 10.

Each link 14 is of the asymmetrical type, that is to say provided with a first end flange 16 facing outwards the track 10, if seen with reference to the longitudinal central axis B-B, and with a second end flange 18 facing inwards the track 10 or, in other words, towards the longitudinal central axis B-B of the track 10 itself.

Each link 14 is thus provided with a first, substantially flat, upper surface 20 intended to irremovably support the shoes 48 (FIG. 3), which complete the tracks of the vehicle. For such a purpose, on the first upper surface 20 of each link 14 one or more through holes 22 are performed intended to receive the engagement means 50, usually bolts, between the link 14 itself and the relative shoe 48 intended to rest on the ground.

Each link 14 is moreover provided with a second, also substantially flat, lower guide surface 24 opposite with respect to the first upper surface 20 and intended to be engaged with the driven wheels, the lower rollers and the upper rollers for supporting the track, of the track-type vehicle.

On the first end flange 16, facing outwards the track 10, of every link 14 a first through hole 26 is obtained oriented according to an axis A-A perpendicular to the longitudinal central axis B-B of the track 10. At the two opposite ends of the through hole 26 a first annular groove 28, facing outwards the track 10, and a second annular groove 30, facing inwards the track 10, the functions of which shall be specified hereafter, are then respectively obtained. In particular, the external 28 and internal 30 annular grooves have an internal diameter which is greater with respect to the internal diameter of the through hole 26. Even more specifically, the internal annular groove 30 has an internal diameter which is greater with respect to the internal diameter of the external annular groove 28.

Similarly, on the second end flange 18, facing inwards the track 10, of every link 14, a second through hole 32, also oriented according to an axis A-A perpendicular to the longitudinal central axis B-B of the track 10, is made.

At one of the two opposite ends of such a through hole 32, in this case, the end facing inwards the track 10, an annular groove 34 the internal diameter of which is greater than the internal diameter of the adjacent through hole 32, is then made. In addition, as can be seen from the section of FIG. 4, the internal diameter of the annular groove 34 of the second through hole 32 and the internal diameter of the internal annular groove 30 of the first through hole 26, are substantially equal. This characteristic allows particular elements of the track 10, which shall be specified soon after, to be inserted inside the internal annular grooves 30 and 34, respectively, of the first through hole 26 and of the second through hole 32.

According to the invention, due to the use of improved sliding bearings, having particularly low thicknesses and described more in detail hereafter, on the first end flange 16 and on the second end flange 18 of each link 14 it is possible to respectively make a first through hole 26 and a second through hole 32 having a substantially similar diameter. In particular, according to a preferred embodiment, illustrated in FIGS. 4-7, the ratio $R_0$ between the internal diameter $D_2$ of the second through hole 32 of the second end flange 18 of each link 14 and the internal diameter $D_1$ of the first through hole 26 of the first end flange 16 of each link 14 is comprised in the range between 1 and 1.25. Preferably, such a ratio is equal to 1.1.

Figure 5:
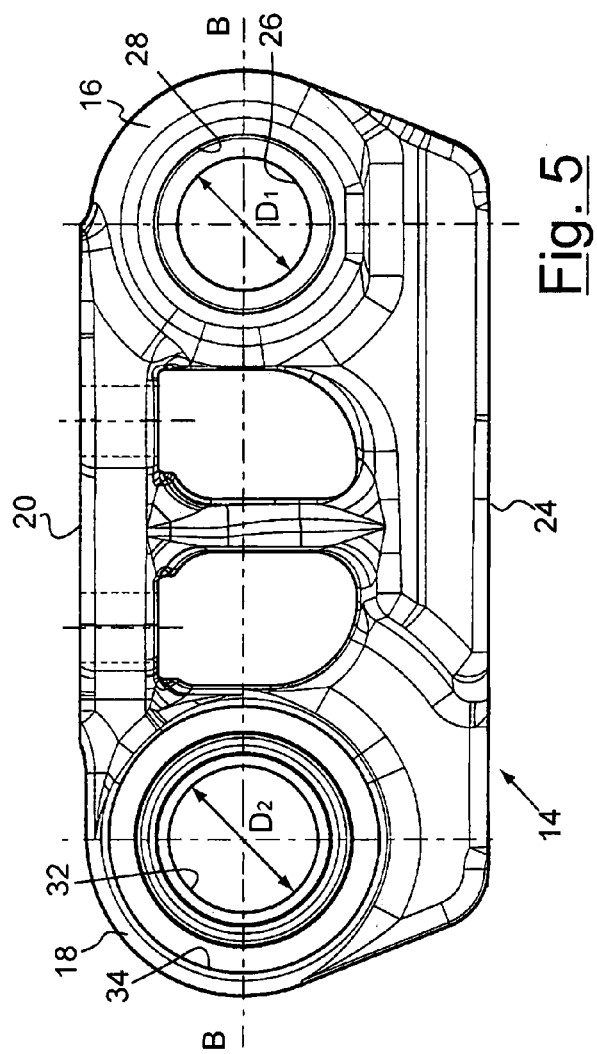
FIG. 5 is a side view of a link belonging to the track with rotating bushings obtained according to the present invention.

Basically, with reference to the values given in FIG. 5:

$$R_0 = \frac{D_2}{D_1} < 1.25$$

Preferably:

$$1.05 < R_0 = \frac{D_2}{D_1} < 1.2$$

With reference now to the articulated joints 12, 12', each one of them is mainly made up of a substantially cylindrical pin 36, 36', oriented along an axis A-A perpendicular to the longitudinal central axis B-B of the track 10. Each pin 36, 36' is provided inside with channellings 38 (FIG. 4) intended for the circulation of the lubricant fluid, necessary for the track 10 to work properly. Around each pin 36, 36', and coaxially with respect to it, a bushing 40 free to rotate with respect to the pin 36, 36' itself is mounted. On the external circumferential surface of the rotating bushings 40 the teeth of the driving wheels of the track-type vehicle engage, in a manner such as to set the whole track system in motion.

Each one of the links 14 is connected to a corresponding pin 36 through interference coupling, i.e. in a non-rotatable manner, of its outward facing end flange 16 with one of the ends of the pin 36 itself. In other words, each link 14 is mounted around the relative pin 36 through its insertion inside the through hole 26 foreseen on the first end flange 16 facing outwards of the link 14 itself. According to one preferred embodiment of the track 10, illustrated in the figures, the locking into position between the first end flange 16 facing outwards with respect to the link 14 and the end of the pin 36 is obtained by means of a ring 42 of the "Seeger" type, integrally joined with the pin 36 itself and housed inside the external annular groove 28 foreseen on such an end flange 16.

Each link 14 is moreover rotatably connected to the next pin 36' through the insertion of the latter inside the through hole 32 foreseen on the second end flange 18 facing inwards with respect to the link 14 itself. As shown in the section of FIG. 4, inside of each through hole 32 at least one annular-shaped sliding bearing 44 is then housed.

More precisely, each sliding bearing 44 is housed, press-fitted, between the internal circumferential surface of each through hole 32 and the external circumferential surface of one of the pins 36, 36', guaranteeing the free rotation around the axis A-A thereof.

According to the invention, the sliding bearings 44 are made in a composite material, that is to say, consisting of a natural or synthetic fiber and of a binding resin. In particular, according to a preferred embodiment, the sliding bearings 44 are made from a composite material made up of a synthetic fiber (like for example, carbon fiber, polyester or other technical fibers) and of a phenolic resin that constitutes the binding material. The use of a composite material makes it possible to obtain particularly thin sliding bearings 44 whilst still having a high resistance value to the stresses undergone by the track 10 in the work steps of the track-type vehicle. Therefore, according to the invention, the ratio $R_1$ between the thickness S and the internal diameter D of each sliding bearing 44 can be particularly small, being comprised in the range between 0.02 and 0.10.

Figure 4:
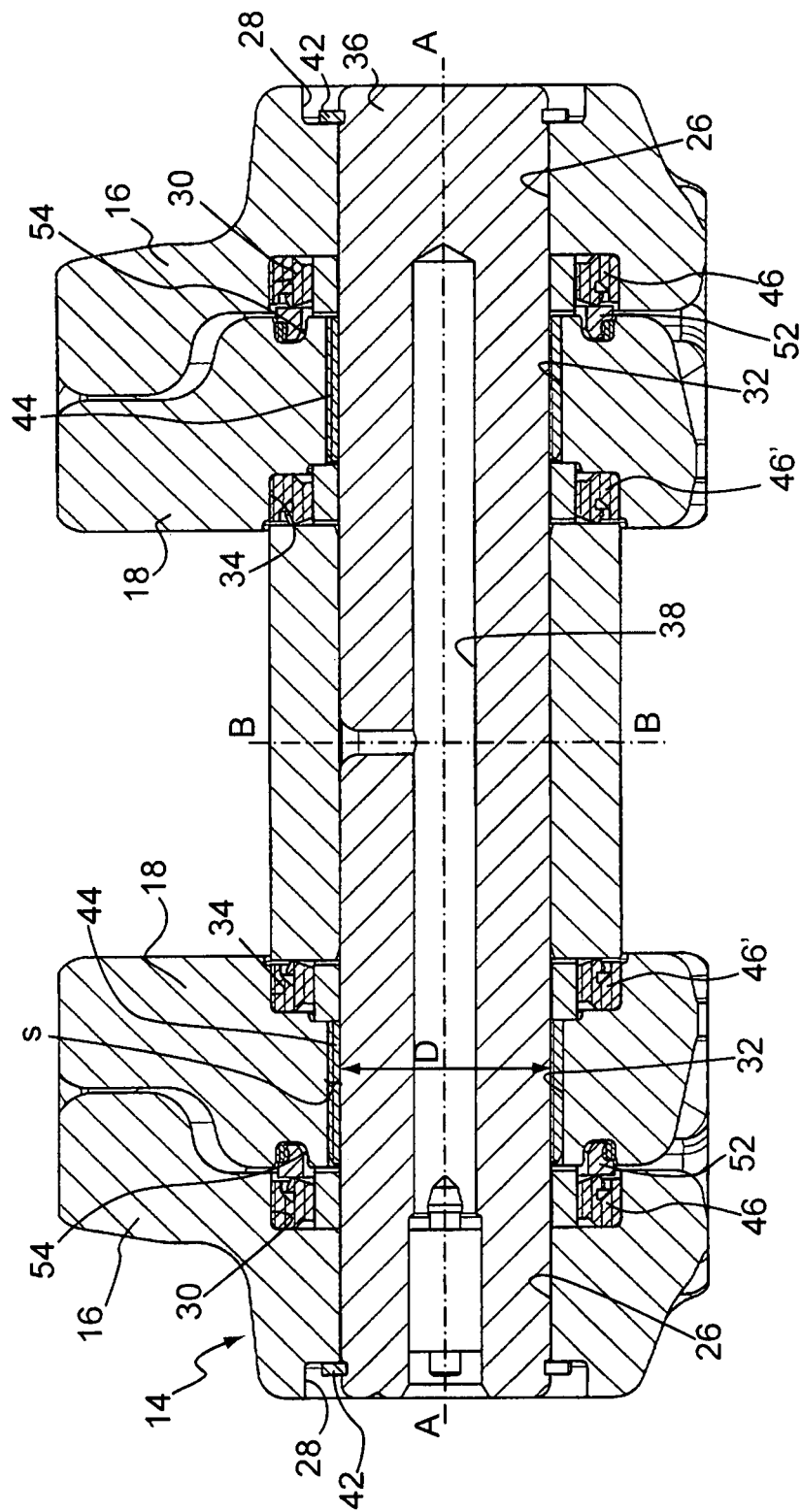
FIG. 4 is a section view, obtained along the line A-A of FIG. 1, of the track with rotating bushings obtained according to the present invention.

Basically, with reference to the values outlined in FIG. 4:

$$0.02 < R_1 = \frac{S}{D} < 0.10$$

As shown in the section of FIG. 4, in the mounted configuration of the track 10, at the sides of each sliding bearing 44, sealing groups 46, 46' are provided intended to cooperate with the rotating bushings 40, the links 14 and the sliding bearings 44 themselves to provide a sealing system for the articulated joints 12, 12'. In detail, for each sliding bearing 44, one of the sealing groups 46 is housed inside the second annular groove 30, facing inwards the track 10, made at the first through hole 26 of each link 14, whereas the other sealing group 46' is housed inside the annular groove 34, facing inwards the track 10, made at the second through hole 32 and is interposed between the sliding bearing 44 itself and the rotating bushing 40.

In particular, the sealing system between pairs of links 14 connected to the same pin 36 (FIG. 4) is obtained thanks to the cooperation of the sealing group 46 with a resting surface of a link insert 52, housed inside a top annular seat 54 made on the second end flange 18 of one of the links 14 so as to face the second annular groove 30 of the adjacent link 14. A lubrication chamber is thus defined between the sealing group 46 and the link insert 52. The link insert 52 comprises a circumferential rigid insert positioned in the top annular seat 54 and an elastic ring, concentric to and laying over the circumferential rigid insert, intended to make contact with the seat 54 itself, circumferentially, to generate the necessary compression thrust on the rigid insert. In other words, the axial pressure exerted by the elastic ring on the rigid insert is used for keeping the contact constant between the sealing group 46 and the resting surface of the rigid insert even when there are bumps or vibrations that frequently occur during the use of track-type vehicles.

Typically, the circumferential rigid insert of the link insert 52 can be made from cast iron, hardened steel or casehardened or tempered steel. Further details of the sealing system can be of the type described in the international patent application No. WO2008/093160, to the same Applicant, and shall therefore not be described in detail hereafter.

According to a preferred embodiment of the present invention, in order to increase the structural rigidity of the links 14 and, consequently, of the entire track 10, it has been found that the ratio $R_2$ between the overall width $L_1$ of the lower guide surface 24 of each link 14 and the overall thickness $L_2$ of the first end flange 16, facing outwards the track 10, of the link 14 itself must be greater than 1. Preferably, such a ratio $R_2$ is comprised in the range between 1.1 and 1.3.

Moreover, the ratio $R_3$ between the overall width $L_1$ of the lower guide surface 24 of each link 14 and the offset $L_3$ between the external surface of the first end flange 16, at the first annular groove 28, and the external edge of the lower guide surface 24 of the link 14 itself must be greater than 1.35. Preferably, such a ratio $R_3$ is comprised in the range between 1.4 and 1.65.

Finally, the ratio $R_4$ between the overall thickness $L_2$ of the first end flange 16 of each link 14 and the overall thickness $L_4$ of the second end flange 18, facing inwards the track 10, of the link 14 itself must be smaller than 1.25. Preferably, such a ratio $R_4$ is comprised in the range between 1 and 1.1.

Figure 7:
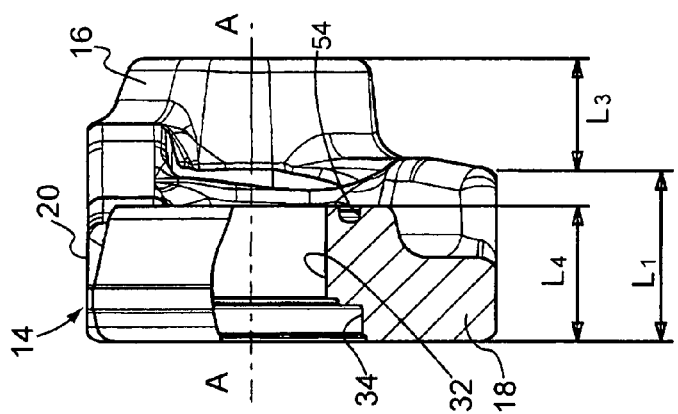
FIG. 7 is another partial section side view of the link of FIG. 5.
Figure 6:
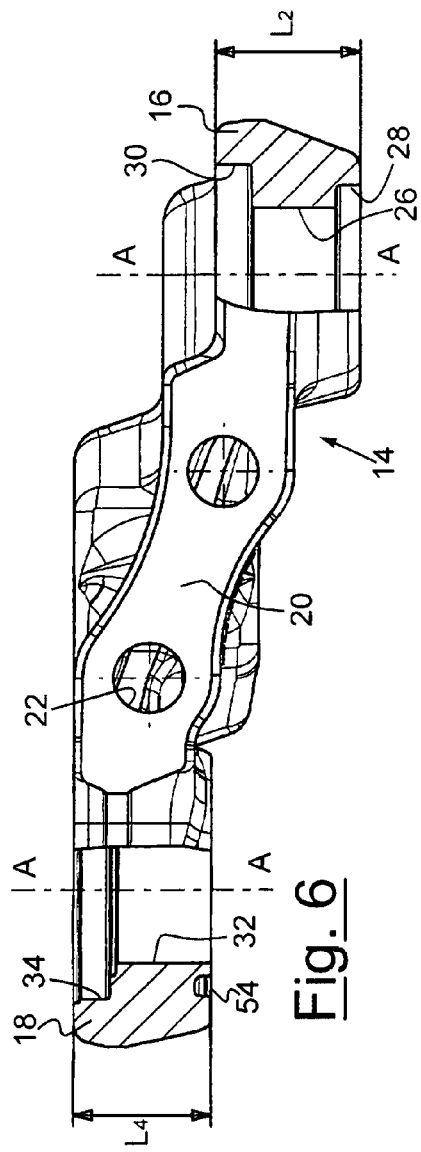
FIG. 6 is a partial section plan view of the link of FIG. 5.

Basically, with reference to the values outlined in FIGS. 6 and 7:

$$R_2 = \frac{L_1}{L_2} > 1 \quad R_3 = \frac{L_1}{L_3} > 1.35 \quad R_4 = \frac{L_2}{L_4} < 1.25$$

Preferably:

$$1.1 < R_2 < 1.3 \quad 1.4 < R_3 < 1.65 \quad 1 < R_4 < 1.1$$

The aforementioned geometrical/size characteristics of the links 14 therefore make it possible to obtain an overall resistant section which is greater than that of known type links. Consequently, even if there is a bushing 40 of the rotating type, the stability of the articulated joints 12, 12' is not compromised even though the bushing 40 itself is no longer a single piece with the links connected to it, as occurs on the other hand, in conventional type tracks with a fixed bushing. The quality of the materials and the particular size characteristics of the sliding bearings 44 finally make it possible to obtain a good resting surface for the links 14 on the relative pins 36, 36' even if such elements are deformed in loaded conditions, as happens when the articulated joints 12, 12' are biased in the work steps of the track-type vehicle. The use of the sliding bearings 44 in phenolic resin having small thickness indeed makes it possible to make monolithic links 14 having high resistant sections, much greater than the links present to this day on the market.

It has thus been seen that the track with rotating bushings for track-type vehicles provided with improved sliding bearings according to the present invention achieves the purposes previously highlighted.

The track with rotating bushings for track-type vehicles provided with improved sliding bearings according to the present invention thus conceived can in any case undergo numerous modifications and variants, all covered by the same inventive concept; moreover, all the details can be replaced by technically equivalent elements. In practice the materials used, as well as the shapes and sizes, can be any according to the technical requirements.

The scope of protection of the invention is thus defined by the attached claims.

The invention claimed is:

1. Track (10) for track-type vehicles, comprising a continuous sequence of articulated joints (12, 12') of the hinge type, and comprising pins (36, 36') oriented according to a first axis (A-A) substantially perpendicular to the longitudinal central axis (B-B) of the track (10), said articulated joints (12, 12') being connected to each other and maintained at a constant distance through pairs of links (14) having longitudinal development, arranged laterally and symmetrically with respect to said longitudinal central axis (B-B), each link (14) being provided with a first end flange (16) facing outwards of the track (10), with reference to said longitudinal central axis (B-B), and with a second end flange (18) facing inwards of the track (10), with reference to said longitudinal central axis (13-B), each link (14) being provided with a first upper surface (20) and a second lower guide surface (24), opposite with respect to said first upper surface (20), made on said first end flange (16) being a first through hole (26), oriented according to said first axis (A-A), fur the non-rotatable connection of said link (14) with one of the pins (36, 36') of said articulated joint (12, 12'), and made on said second end flange (18) being a second through hole (32), oriented according to said first axis (A-A), for the rotatable connection of said link (14) with one of said pins (36, 36'), at least an annular sliding bearing

(44) being housed inside said second through hole (32) of each link (14), characterized in that said sliding bearing (44) is made from a composite material consisting of a natural or synthetic fiber and a binding resin, and in that:

the ratio ($R_0$) between the internal diameter ($D_2$) of the second through hole (32) of the second end flange (18) of each link (14) and the internal diameter ($D_1$) of the first through hole (26) of the first end flange (16) of each link (14) is smaller than 1.25, the ratio ($R_1$) between the thickness (S) and the internal diameter (D) of said sliding bearing (44) is comprised in the range between 0.02 and 0.1, the ratio ($R_2$) between the overall width ($L_1$) of said second lower guide surface (24) and the overall thickness ($L_2$) of said first end flange (16) is greater than 1, the ratio ($R_3$) between the overall width ($L_1$) of said second lower guide surface (24) and an offset ($L_3$) between an external surface of said first end flange (16) and an external edge of said second lower guide surface (24) is greater than 1.35, and the ratio ($R_4$) between the overall thickness ($L_2$) of said first end flange (16) and the overall thickness ($L_4$) of said second end flange (18) is smaller than 1.25.

2. Track (10) according to claim 1, characterized in that said composite material consists of a synthetic fiber and a phenolic resin that constitutes the binding material.

3. Track (10) according to claim 2, characterized in that said ratio ($R_0$) between the internal diameter ($D_2$) of the second through hole (32) of the second end flange (18) of each link (14) and the internal diameter ($D_1$) of the first through hole (26) of the first end flange (16) of each link (14) is comprised in the range between 1.05 and 1.2.

4. Track (10) according to claim 2, characterized in that said ratio ($R_2$) between the overall width ($L_1$) of said second lower guide surface (24) and the overall thickness ($L_2$) of said first end flange (16) is comprised in the range between 1.1 and 1.3.

5. Track (10) according to claim 2, characterized in that said ratio ($R_3$) between the overall width ($L_1$) of said second lower guide surface (24) and the offset ($L_3$) between the external surface of said first end flange (16) and the external edge of said second lower guide surface (24) is comprised in the range between 1.4 and 1.65.

6. Track (10) according to claim 2, characterized in that said ratio ($R_4$) between the overall thickness ($L_2$) of said first end flange (16) and the overall thickness ($L_4$) of said second end flange (18) is comprised in the range between 1 and 1.1.

7. Track (10) according to claim 1, characterized in that said ratio ($R_0$) between the internal diameter ($D_2$) of the second through hole (32) of the second end flange (18) of each link (14) and the internal diameter ($D_1$) of the first through hole (26) of the first end flange (16) of each link (14) is comprised in the range between 1.05 and 1.2.

8. Track (10) according to claim 1, characterized in that said ratio ($R_2$) between the overall width ($L_1$) of said second lower guide surface (24) and the overall thickness ($L_2$) or said first end flange (16) is comprised in the range between 1.1 and 1.3.

9. Track (10) according to claim 1, characterized in that said ratio ($R_3$) between the overall width ($L_1$) of said second lower guide surface (24) and the offset ($L_3$) between the external surface of said first end flange (16) and the external edge of said second lower guide surface (24) is comprised in the range between 1.4 and 1.65.

10. Track (10) according to claim 1, characterized in that said ratio ($R_4$) between the overall thickness ($L_2$) of said first end flange (16) and the overall thickness ($L_4$) of said second end flange (18) is comprised in the range between 1 and 1.1.

11. Track (10) according to claim 1, characterized in that said sliding bearing (44) is press-fitted between the internal circumferential surface of said second through hole (32) and the external circumferential surface of said pin (36, 36'), guaranteeing the free rotation around said first axis (A-A) thereof.

12. Track (10) according to claim 11, characterized in that mounted around said pin (36, 36'), and coaxially with respect thereto, is a bushing (40) free to rotate with respect to said pin (36, 36').

13. Track (10) according to claim 12, characterized in that two sealing groups (46, 46') are provided on each side of said sliding bearings (44), said sealing groups (46, 46') being intended to cooperate with said bushing (40), said links (14) and said sliding bearings (44) to provide a sealing system for the articulated joints (12, 12').

14. Track (10) according to claim 13, characterized in that a first of said sealing groups (46) is housed inside an annular groove (30) facing inwards of the track (10), with reference to said longitudinal central axis (B-B), obtained at said first through hole (26).

15. Track (10) according to claim 14, characterized in that a second of said sealing groups (46') is housed inside an annular groove (34) facing towards the inside of the track (10), with reference to said longitudinal central axis (B-B), made at said second through hole (32), and it is interposed between said sliding bearing (44) and said rotating bushing (40).

16. Track (10) according to claim 14, characterized in that the sealing system between pair of links (14) connected to the same pin (36) is obtained thanks to the cooperation of said first sealing group (46) with a support surface of a link insert (52), housed in a top annular seat (54) made on said second end flange (18) of one of the links (14) so as to face said annular groove (30) facing inwards of the track (10) of the adjacent link (14), therefore defining a lubrication chamber between said first sealing group (46) and said link insert (52).

17. Track (10) according to claim 16, characterized in that said link insert (52) comprises a circumferential rigid insert, positioned in said top annular seat (54), and an elastic ring, concentric to and laying over the circumferential rigid insert, intended to make contact circumferentially with said top annular seat (54) to generate the necessary compression thrust on the circumferential rigid insert.

18. Track (10) according to claim 1, characterized in that the non-rotatable connection of said link (14) with said pin (36, 36') is obtained by means of a ring (42) of the "Seeger" type, integrally joined with said pin (36, 36') and housed inside an annular groove (28) facing outwards of the track (10), with reference to said longitudinal central axis (B-B), obtained on said first end flange (16) at said first through hole (26), said ring (42) providing the locking in position between said first end flange (16) and the end of said pin (36, 36').

* * * * *